United States Patent
Batruni

(10) Patent No.: US 8,340,294 B2
(45) Date of Patent: *Dec. 25, 2012

(54) SECURE MODULATION AND DEMODULATION

(75) Inventor: Roy G. Batruni, Fremont, CA (US)

(73) Assignee: Netlogic Microsystems, Inc., Santa Clara, CA (US)

( * ) Notice: Subject to any disclaimer, the term of this patent is extended or adjusted under 35 U.S.C. 154(b) by 997 days.

This patent is subject to a terminal disclaimer.

(21) Appl. No.: 12/008,709

(22) Filed: Jan. 10, 2008

(65) Prior Publication Data

US 2008/0181402 A1 Jul. 31, 2008

Related U.S. Application Data

(63) Continuation of application No. 10/429,271, filed on May 2, 2003, now Pat. No. 7,369,658.

(60) Provisional application No. 60/461,237, filed on Apr. 7, 2003.

(51) Int. Cl.
H04L 9/00 (2006.01)

(52) U.S. Cl. .......................................... 380/263; 380/46

(58) Field of Classification Search .................... 380/46, 380/263

See application file for complete search history.

(56) References Cited

U.S. PATENT DOCUMENTS

| | | | |
|---|---|---|---|
| 3,795,799 A * | 3/1974 | Courtiol ........................... 700/30 |
| 4,829,236 A * | 5/1989 | Brenardi et al. ................. 324/74 |
| 4,908,860 A * | 3/1990 | Caprarese et al. ............ 380/238 |
| 5,025,453 A | 6/1991 | Hurinville |
| 5,841,866 A * | 11/1998 | Bruwer et al. ................... 705/66 |
| 6,215,878 B1 * | 4/2001 | Harkins ......................... 380/281 |
| 7,369,658 B2 | 5/2008 | Batruni |
| 7,672,453 B1 * | 3/2010 | Matolak ........................... 380/35 |
| 2003/0031245 A1* | 2/2003 | O'Brien ......................... 375/238 |
| 2004/0164791 A1* | 8/2004 | Batruni .......................... 327/552 |
| 2004/0199082 A1 | 10/2004 | Ostroff et al. |

OTHER PUBLICATIONS

IIR Digital Filter Design Applet Aug. 18, 2000.*
PCT/US04/08390 Search Report and Written Opinion mailed Aug. 12, 2005.
"IIR Digital Filter Design applet" http://dsptutor.freeuk.com/IIRFilterDesign/.html, Aug. 18, 2008.
Frank, Walter A., "An Efficient Approximation to the Quadratic Volterra Filter and its Application I Realtime Loudspeaker Linearization", Universitat der Bundeswehr Munchen, D85577 Neubiberg Germany, 1995.
Giannakis, Georgios B., "Blind Fractionally Spaced Equalization of Noisy FIR Channels: Direct and Adaptive Solutions", IEEE Transactions on Signal Processing, vol. 45, No. 9, Sep. 1997.
Griffith, David W., Jr. et al., "Partially Decoupled Volterra Filters: Formulation and LMS Adaptation" Dept. of Engineering, University of Delaware, Newark, Delaware, Oct. 1996.
Schulz-Mirbach, Hanns, "Nonlinear Model-Based Analysis and Description of Images for Multimedia Applications", Internal Report Jul. 1996, TU Hamburg-Harburg, Technische Informatik I, Oct. 1996.

* cited by examiner

*Primary Examiner* — Christopher Brown
(74) *Attorney, Agent, or Firm* — Sterne, Kessler, Goldstein & Fox P.L.L.C.

(57) ABSTRACT

A system and method are disclosed for securely transmitting and receiving a signal. A nonlinear keying modulator is used in the transmitter to encrypt the signal using a nonlinear keying modulation technique. A nonlinear keying demodulator is used in the receiver to decrypt the signal.

38 Claims, 13 Drawing Sheets

SECURE MODULATION AND DEMODULATION

CROSS REFERENCE TO RELATED APPLICATIONS

This application is a continuation of U.S. patent application Ser. No. 10/429,271, entitled SECURE MODULATION AND DEMODULATION filed May 2, 2003, now U.S. Pat. No. 7,369,658 which is incorporated herein by reference for all purposes, which claims priority to U.S. Provisional Application No. 60/461,237 entitled A METHOD FOR SECURE MODULATION USING NONLINEAR KEYING filed Apr. 7, 2003 which is incorporated herein by reference for all purposes.

FIELD OF THE INVENTION

The present invention relates generally to signal processing. More specifically, a technique for transmitting and receiving signals is disclosed.

BACKGROUND OF THE INVENTION

Many modern communication systems use linear modulation techniques for encoding and decoding information. These techniques are typically amplitude and/or phase modulation techniques that map a symbol alphabet to a set of signals. For example, one of the simplest modulation techniques is pulse amplitude modulation (PAM), which maps a symbol alphabet $\{a_0, a_1, \ldots, a_{N-1}\}$ to N transmission levels. Other examples of linear modulation techniques include phase shift keying (PSK) that maps the symbol alphabet to N phases, and quadrature amplitude modulation (QAM) that maps the symbol alphabet to both amplitude and phase shifted symbols.

Techniques for demodulating a linearly modulated signal to recover the original input, such as de-convolution and de-correlation, are well known and fairly straightforward to implement. It is possible for an unauthorized third-party to gain access to the transmission channel, intercept the signal, use standard demodulation techniques to demodulate the signal and recover the input, thereby compromising the security of such a transmission system. It would be desirable to have a transmission system that would provide additional security at the physical layer, and prevent unauthorized parties from eavesdropping.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

It should be appreciated that the present invention can be implemented in numerous ways, including as a process, an apparatus, a system, or a computer readable medium such as a computer readable storage medium or a computer network wherein program instructions are sent over optical or electronic communication links. It should be noted that the order of the steps of disclosed processes may be altered within the scope of the invention.

A detailed description of one or more preferred embodiments of the invention is provided below along with accompanying figures that illustrate by way of example the principles of the invention. While the invention is described in connection with such embodiments, it should be understood that the invention is not limited to any embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention. The present invention may be practiced according to the claims without some or all of these specific details. For the purpose of clarity, technical material that is known in the technical fields related to the invention has not been described in detail so that the present invention is not unnecessarily obscured.

A technique for secure communication is disclosed. The technique employs a nonlinear keying modulator in the transmitter to nonlinearly encrypt the signal, and a corresponding nonlinear keying demodulator in the receiver to decrypt the transmitted signal. In some embodiments, several cascaded nonlinear key modulators and demodulators are used in the transmitters and receivers, respectively. In some embodiments, a key is exchanged between the transmitter and the receiver for the purpose of configuration.

Figure 1:
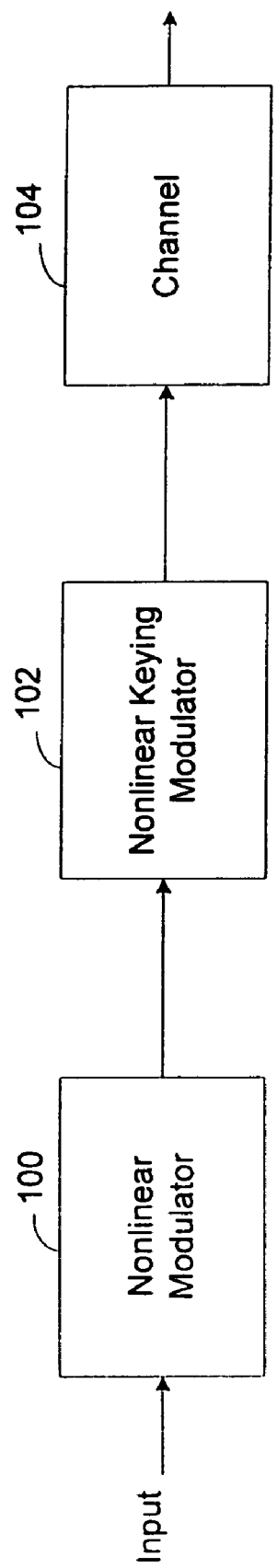
FIG. 1 is a block diagram illustrating a transmitter embodiment.

FIG. 1 is a block diagram illustrating a transmitter embodiment. Linear modulator 100 modulates the input linearly using amplitude and/or phase modulation, or any other appropriate techniques. The linearly modulated signal is sent to a nonlinear keying modulator (NKM) 102, to be encrypted using a nonlinear keying modulation technique. The output of the NKM is then transmitted via channel 104. The nonlinear keying modulation technique allows for many more permutations to be used for keying the amplitude and/or phase of the output signals, and also increases symbol dependency, making it difficult for eavesdroppers to decrypt the transmitted signal. Although the nonlinear modulation occurs after the linear modulation in the embodiment shown, the ordering of the modulators may be different in other embodiments. In some embodiments the nonlinear modulation occurs prior to the linear modulation.

There are many ways to implement the NKM in the transmitter to achieve nonlinear effects. The receiver requires a corresponding nonlinear keying demodulator (NKD) to demodulate the received signal and undo the effects of the NKM. A technique for designing nonlinear filters and deriving their inverse is introduced by Batruni in U.S. patent application Ser. No. 10/418,944 entitled NONLINEAR INVERSION filed Apr. 18, 2003, which is incorporated herein by reference for all purposes. Using this technique, the NKM is designed as a nonlinear filter comprised of linear filters, nonlinear elements and a combination network connecting the linear filters and nonlinear elements.

Figure 2:
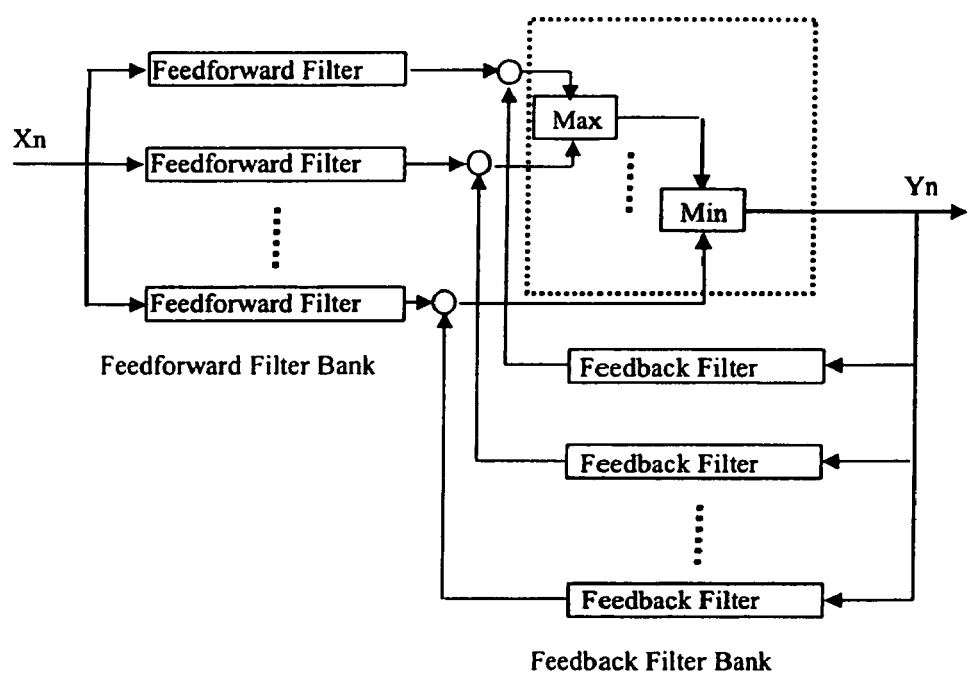
FIG. 2 is a block diagram illustrating a nonlinear keying modulator embodiment.

FIG. 2 is a block diagram illustrating a nonlinear keying modulator embodiment. The input is sent to a feedforward filter bank that includes feedforward filters 200, 202 and 204. The feedforward filters are combined with filters in a feedback filter bank, including feedback filters 206, 208 and 210, respectively, to form several pairs of linear filters. The outputs of the feedforward filters are summed with the outputs of the feedback filters to form the linear filters. For the purpose of example, $A1(z)$, $A2(z)$, $A3(z)$ are used to denote Z-domain transfer functions for feedforward filters 200, 202 and 204, respectively, and $B1(z)$, $B2(z)$, $B3(z)$ are used to denote transfer functions for feedback filters 206, 208 and 210. Thus, the corresponding linear filters formed by the pairs of feedforward and feedback filters are: $A1(z)/B1(z)$, $A2(z)/B2(z)$, $A3(z)/B3(z)$. The poles of the linear filters are determined by the transfer functions of the feedforward filters where as the zeros of the linear filters are determined by the transfer function of the feedback filters.

Each of the linear filters is an infinite impulse response (IIR) filter. In some embodiments, the feedback filters shown in FIG. 2 are absent, thus rendering the NKM a feedforward only system. In some embodiments, the feedforward filters shown in FIG. 2 are absent, thus rendering the NKM a feedback only system.

The summed outputs of the filter pairs are sent to a combination network 216. The combination network connects the linear filters and the nonlinear elements such as the minimum-maximum processors. In this embodiment, the combination network is a minimum-maximum switching matrix that connects a maximum processor 212 and a minimum processor 214 with the linear filters. In this specification, a minimum or maximum processor (also referred to as a minimum-maximum processor) may be a part or the whole of an integrated circuit, one or more discrete components, a part or the whole of a software program, or any other appropriate hardware or software component useful for selecting a minimum or a maximum value from a plurality of inputs. In some embodiments, the processors are programmable to perform either the minimum function or the maximum function. It should be noted that the number of linear filters, minimum-maximum processors and their configurations are implementation dependent, and may vary in other embodiments.

Mathematically, the minimum operation on two inputs, $X1$ and $X2$, is described as:

$$Y = \text{Min}\{X1, X2\} = \frac{1}{2}[X1 + X2 - |X1 - X2|]$$ (Equation 1).

The maximum operation is described as:

$$Y = \text{Max}\{X1, X2\} = \frac{1}{2}[X1 + X2 + |X1 - X2|]$$ (Equation 2).

The transfer function of the NKM shown in the embodiment of FIG. 2 is expressed as:

$$Y(z) = [A3(z)/B3(z)] \& \{[A2(z)/B2(z)]^\wedge [A1(z)/B1(z)]\} X(z)$$ (Equation 3), where & represents the minimum operation and ∧ represents the maximum operation.

Each linear filter's poles and zeros govern the behavior of the system in an input signal subspace. Because the minimum-maximum processors effectively select one of the linear filters at a given point in the signal space, the set of poles and zeros of the selected linear filter govern the behavior of the system in the selected subspace where the linear filter is in effect. At a different point in the signal space, the selected linear filter and the corresponding set of poles and zeros may be different, resulting in different behavior of the system. The system behavior over the entire signal space is therefore nonlinear.

The NKM can be made stable by keeping the poles of the linear filters to be inside the unit circle. Its bandwidth properties can be adjusted by adjusting the zeros of the linear filters. Thus, the NKM provides a nonlinear filter whose transfer characteristics, stability and bandwidth properties are controllable.

Figure 3:
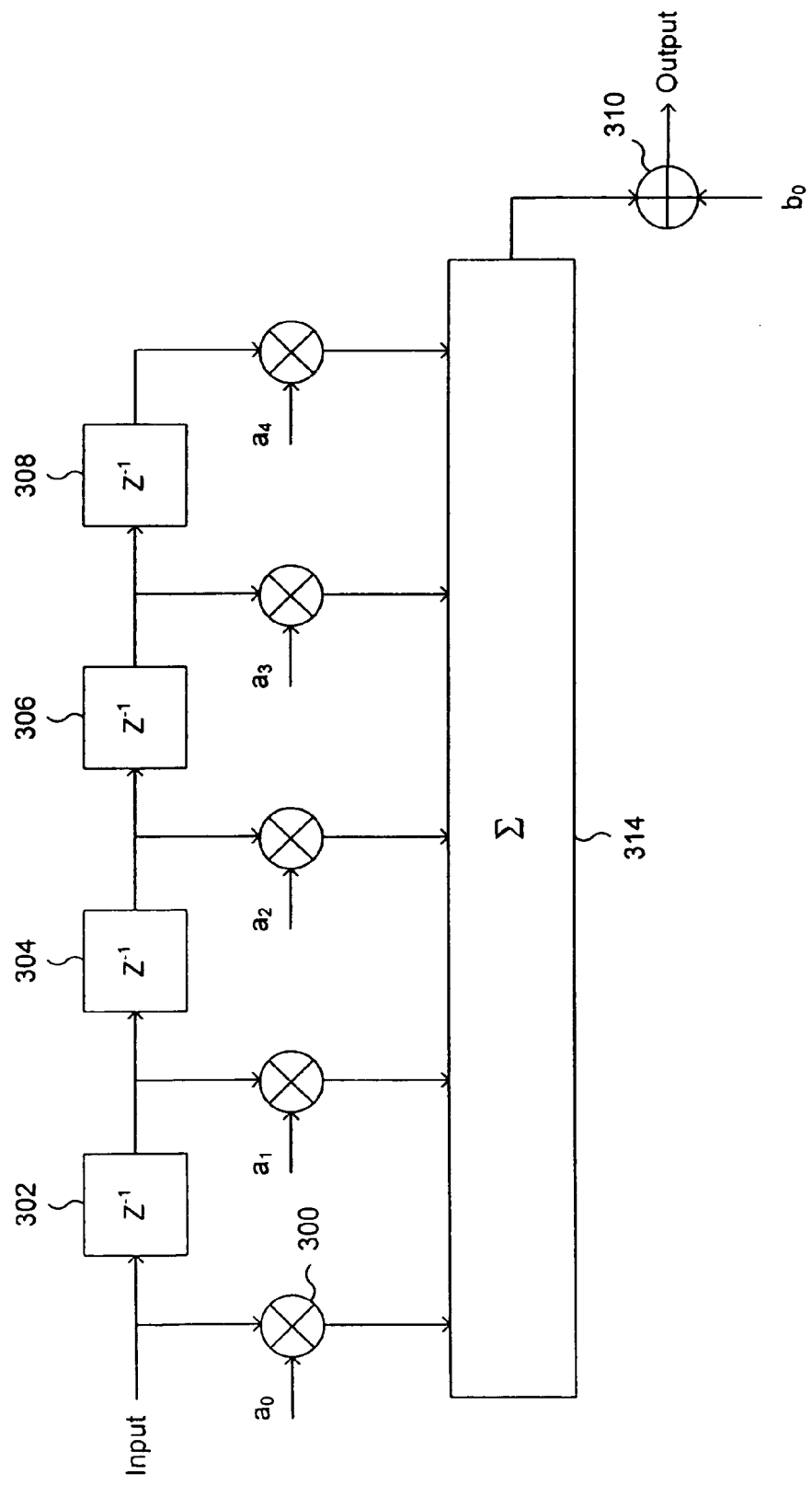
FIG. 3 is a block diagram illustrating the details of a filter embodiment used by the nonlinear keying modulator shown in FIG. 2.

FIG. 3 is a block diagram illustrating the details of a filter embodiment used by the nonlinear keying modulator shown in FIG. 2. Such a filter may be used as the feedforward filter or the feedback filter. The input is scaled by a factor $a_0$ using a multiplier 300. The input is also sent to a plurality of delay stages 302, 304, 306 and 308. The delayed signals are scaled by coefficients of $a1$, $a2$, $a3$ and $a4$. The scaled signals are combined by a combiner 314. A constant value $b_0$ is added to the combined result via another combiner 310 to generate the output. In some embodiments, a constant value is added to the scaled signals directly by combiner 304, and thus combiner 310 is omitted. It should be noted that although FIG. 3 illustrates a linear filter architecture that is commonly used, different types of linear filters may be employed in other embodiments. The number of coefficients and delay stages are chosen for the purpose of illustration, and may be different in some embodiments.

Figure 4:
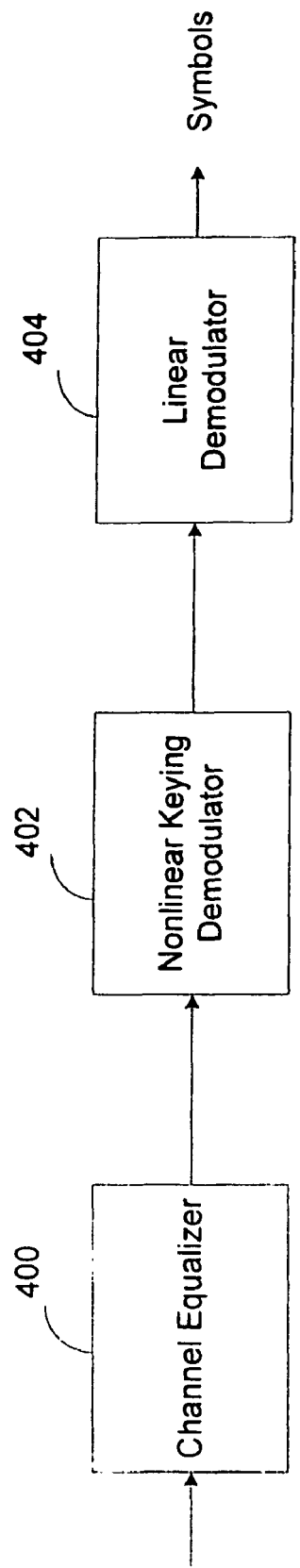
FIG. 4 is a block diagram illustrating a receiver embodiment.

On the receiver side, to recover the modulated symbols, an inverse operation to the nonlinear keying is performed. FIG. 4 is a block diagram illustrating a receiver embodiment. The components in the receiver are arranged in reverse order of the transmitter components shown in FIG. 1. An optional channel equalizer 400 is used to reverse the effects of the channel through which the signal is transmitted. A nonlinear keying demodulator (NKD) 402 performs the inverse function of the NKM in the transmitter. A linear demodulator 404 is used to perform phase or amplitude demodulation to recover the original input symbols. The ordering of the demodulators in the receiver may be different in other embodiments.

Figure 5:
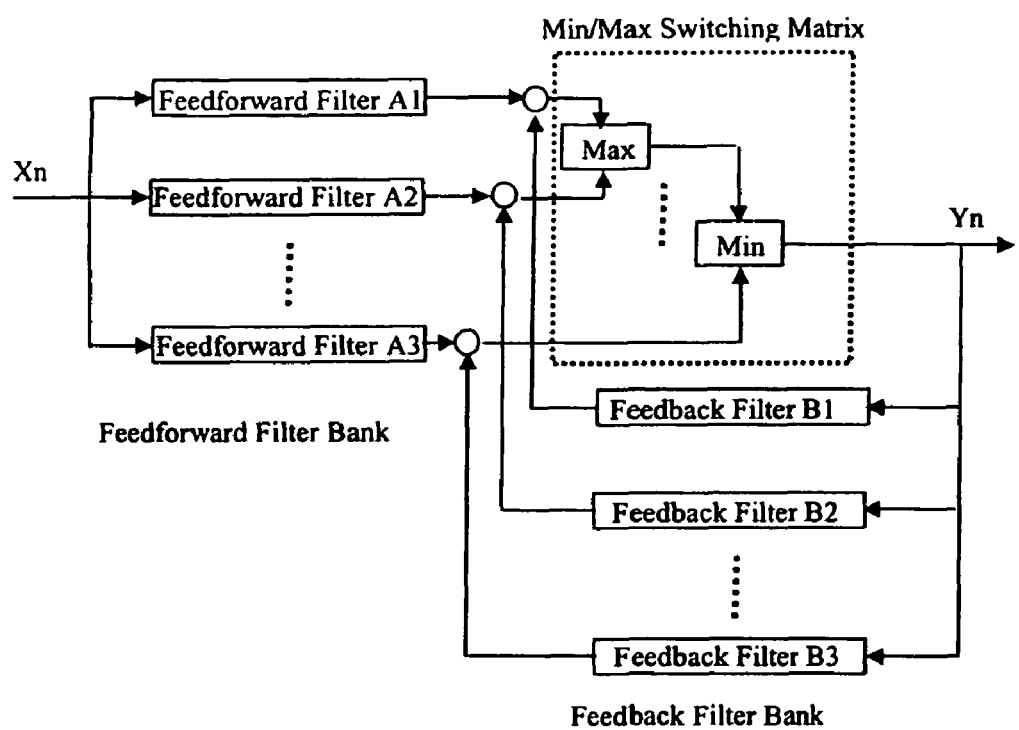
FIG. 5 is a block diagram illustrating a nonlinear keying demodulator embodiment.

FIG. 5 is a block diagram illustrating a nonlinear keying demodulator embodiment. The NKD circuitry is similar to the circuitry of the NKM; that is, the NKD is also comprised of linear filters and minimum-maximum processors combined by a combination network. The NKD is used to demodulate the signal modulated by the NKM shown in FIG. 2, and has a transfer function that is the inverse of the nonlinear transfer function shown in Equation 3. The transfer function of the NKD is expressed as:

$$X(z) = [B3(z)/A3(z)]^\wedge \{[B2(z)/A2(z)] \& [B1(z)/A1(z)]\} Y(z)$$ (Equation 4).

In the NKD, the transfer functions of the linear filters formed by the feedforward and feedback filter pairs are inverses of the transfer functions of the linear filters in the NKM. The inverse transfer functions can be derived by replacing the poles in the original function with zeros, and zeros in the original function with poles. In some embodiments, the coefficients of the feedforward filters and the coefficients of the feedback filters on the NKD are the reverse of the filter coefficients on the NKM. In each feedforward and feedback filter pair on the NKD, the coefficients of the feedforward filter correspond to the coefficients of the NKM's feedback filter, and the coefficients of the feedback filter correspond to the coefficients of the NKM's feedforward filter.

In some embodiments, a filter of the NKM includes a feedforward branch but not a feedback branch. Thus, the corresponding filter in the NKD has a feedback branch but not a feedforward branch, and the coefficients of the feedback branch correspond to the coefficients of the feedforward branches in the NKM. In some embodiments, a filter of the NKM includes a feedback branch but not a feedforward branch. The corresponding filter of the NKD has a feedforward branch but not a feedback branch, and the coefficients of the feedforward branches correspond to the coefficients of the feedback branches in the NKD.

The functions of the minimum-maximum processors are inverted in the inverse filter. The minimum processor in the NKM is replaced with a maximum processor in the NKD and the maximum processor in the NKM is replaced with a minimum processor in the NKD. Thus, switching filter coefficients and inverting the functions of the minimum-maximum processors provides an inverse filter that is used by the NKD to demodulate the transmitted signal.

In some embodiments, to ensure the stability of the NKM, the poles of its linear filters are selected to be inside the unit circle. Since the zeros of the linear filters correspond to the poles of its inverse filter, the zeros of the linear filters of the NKM are also selected to be inside the unit circle so the inverse filters used in the NKD are stable.

The complexity of the NKM and NKD is adjustable to suit the system's demands. A more complex system is more difficult to intercept and demodulate, thus providing better security. A less complex system is generally easier to implement and cheaper. For example, the filter configuration may be adjusted. In some embodiments, the linear filter used in the NKM is a feedforward/feedback filter pair. In some embodiments, the linear filter has a feedforward branch but no feedback branch; hence the corresponding inverse filter has a feedback branch but no feedforward branch. In some embodiments, the filter is a filter with a feedback branch but no feedforward branch; hence the corresponding inverse filter has a feedforward branch but no feedback branch.

There are many other techniques used to adjust the complexity of the NKM and NKD. For example, the number of filter coefficients can be increased or decreased to change the complexity of the filters; the number of filters in the filter bank (i.e. the number of feedforward and feedback filter pairs) may be changed; the transmitter may include several NKM stages and thus the receiver includes several NKD stages that are the inverses of the NKM stages.

Figure 6:
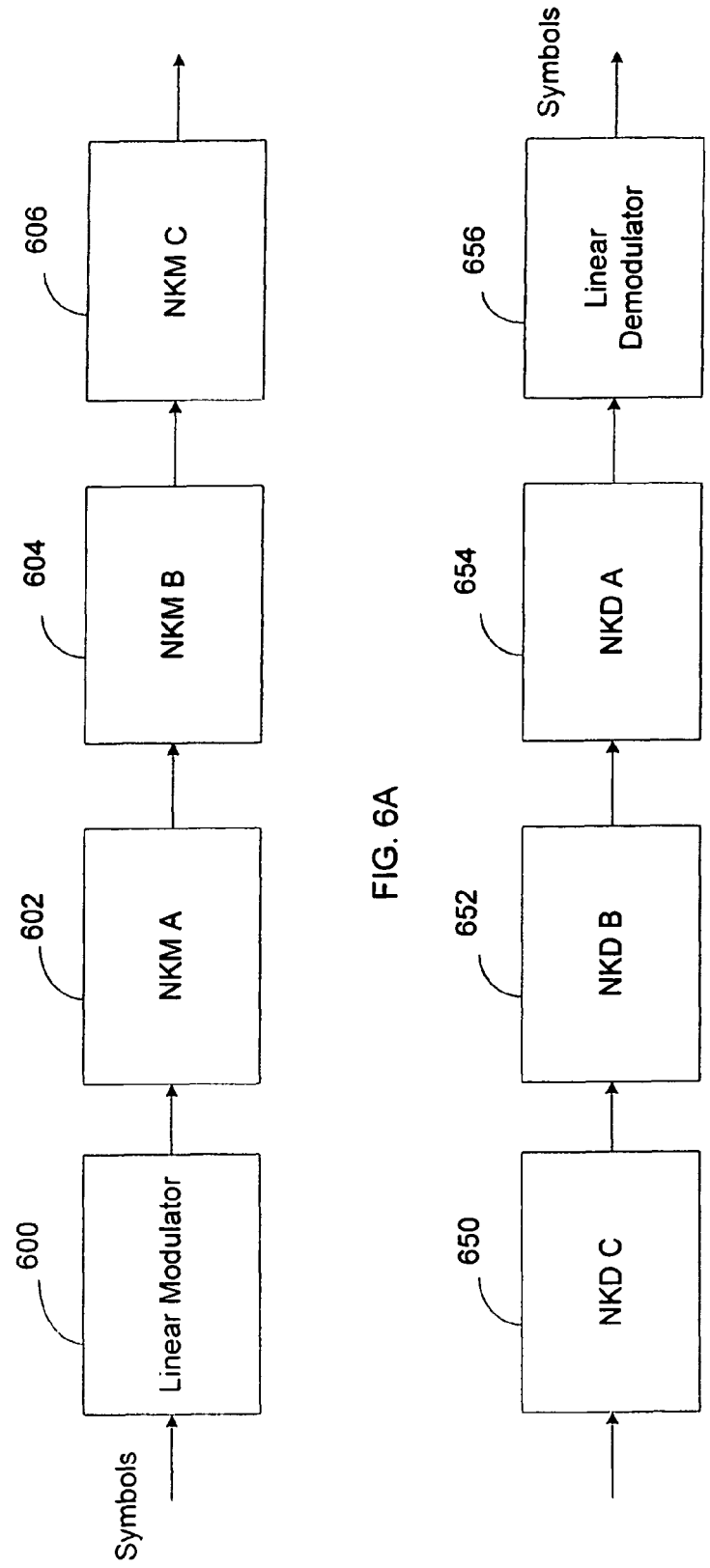
FIG. 6A is a block diagram illustrating a multi-stage transmitter embodiment. Linear modulator 600 modulates the input.
FIG. 6B is a block diagram illustrating a receiver embodiment that corresponds to the transmitter shown in FIG. 6A.

FIG. 6A is a block diagram illustrating a multi-stage transmitter embodiment. Linear modulator 600 modulates the input. The linearly modulated signal goes through three cascaded stages of nonlinear keying modulation by NKM 602, NKM 604 and NKM 606. The multiple nonlinear keying modulation stages increase the depth of the nonlinear modulation and make the modulated signal more difficult to decode.

FIG. 6B is a block diagram illustrating a receiver embodiment that corresponds to the transmitter shown in FIG. 6A. The received signal is demodulated by three NKD stages—NKD 650, 652 and 654, which correspond to the inverses of NKM 606, NKM 604 and NKM 602, respectively. Once demodulated by the NKD's, the signal is sent to linear demodulator 656 and the symbols are recovered. In some embodiments, the transmitter and/or the receiver may also include filters used to compensate the effects of the nonlinear channel through which the signal is transmitted.

The transmitter and the receiver should be correctly configured in order for the receiver to successfully demodulate the transmitted signal and decode information. For a correctly configured transmitter and receiver pair, the demodulation performed by the receiver is the inverse operation of the modulation operation performed by the NKM. In some embodiments, such a configuration is set up by exchanging a key between the transmitter and the receiver. The key includes parameters or any other appropriate information used to configure the receiver or the transmitter.

A device, referred to as the Master, initiates the exchange and sends the key to another device, referred to as the Slave. The slave receives the key and configures itself. In some embodiments, the transmitter is the Master and the receiver is the Slave, thus the receiver configures itself according to the transmitter configuration. In some embodiments, the transmitter is the Slave and the receiver is the Master, thus the transmitter configures itself according to the receiver configuration.

In some embodiments, the key includes topology information for deriving the topology of the nonlinear elements, the combination network, and the linear filters. The key also includes filter information for deriving the configurations of the linear filters, such as the pole-zero pairs of the filter banks. In some embodiments, the key includes configuration information regarding the number of cascaded NKM or NKD blocks, and information regarding the following parameters for each block separately: the number of feedback filters and feedforward filters; the number of coefficients in each of the feedforward filters and feedback filters; the coefficients of the feedforward and feedback filters; and the topology of the minimum-maximum switching matrix connecting the feedforward and feedback filters.

Figure 7:
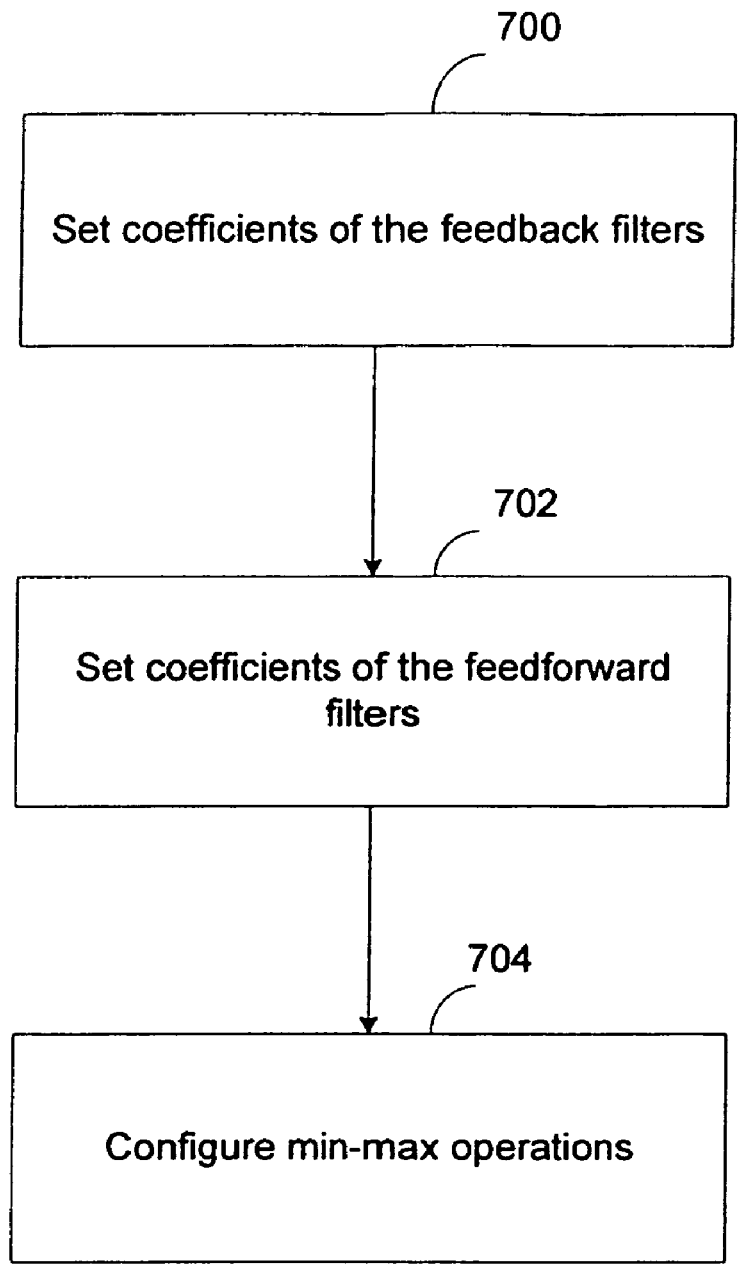
FIG. 7 is a flowchart illustrating the configuration process of a Slave device upon receiving the key, according to one embodiment.

The information included in the key is used to configure the Slave. If the Slave is the receiver, the key is used to configure the NKD as the inverse of the transmitter's NKM. If the Slave is the transmitter, the key is used to configure the NKM as the inverse of the receiver's NKD. FIG. 7 is a flowchart illustrating the configuration process of a Slave device upon receiving the key, according to one embodiment. The coefficients of the feedback filters in the Slave are set to be the coefficients of the feedforward filters in the Master (700). The coefficients of the feedforward filters in the Slave are set to be the coefficients of the feedback filters in the Master (702). In the minimum-maximum switching matrix, the minimum operations in the Master are configured as maximum operations in the Slave and vice versa (704). It should be noted that the ordering of the steps may be different in some embodiments. In certain embodiments, the steps take place in parallel. Unlike conventional security systems, the system does not require the receiver to be synchronized with symbols or code words sent by the transmitter. Once the key is exchanged between the transmitter and the receiver and the configurations are updated, the transmitter can commence transmission and the receiver is able to demodulate the raw channel output properly.

Figure 8A:
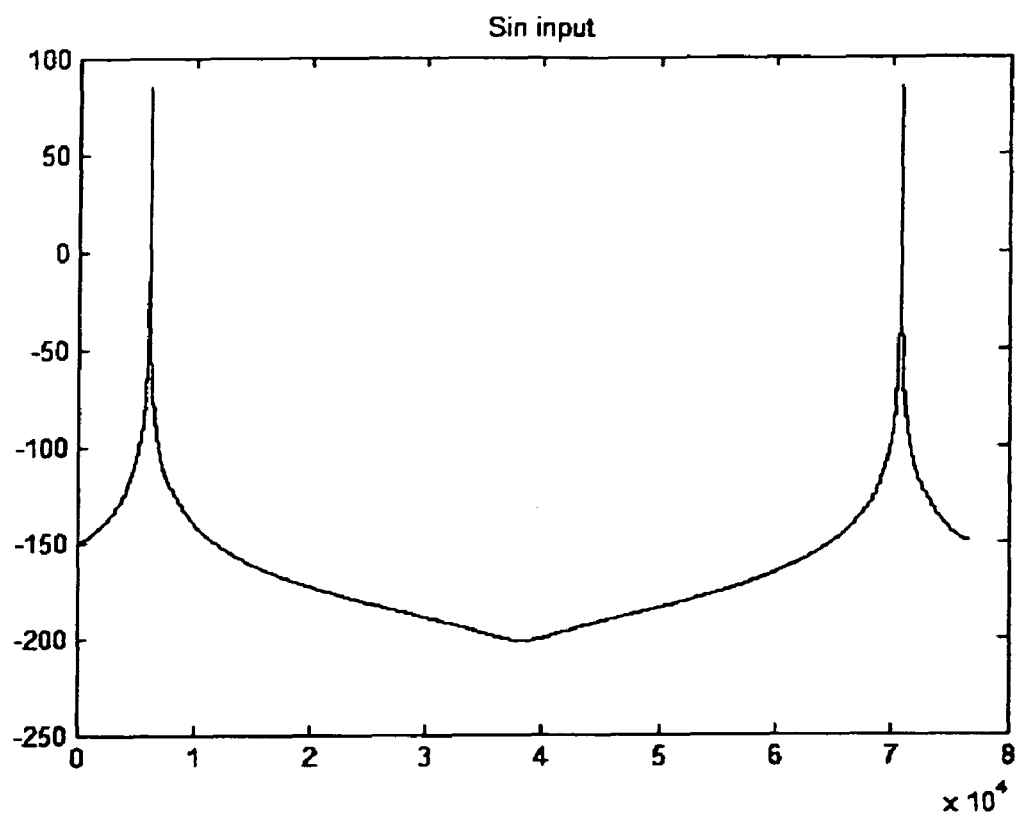
FIG. 8A is a plot illustrating the spectrum of an input sinusoid.
Figure 8B:
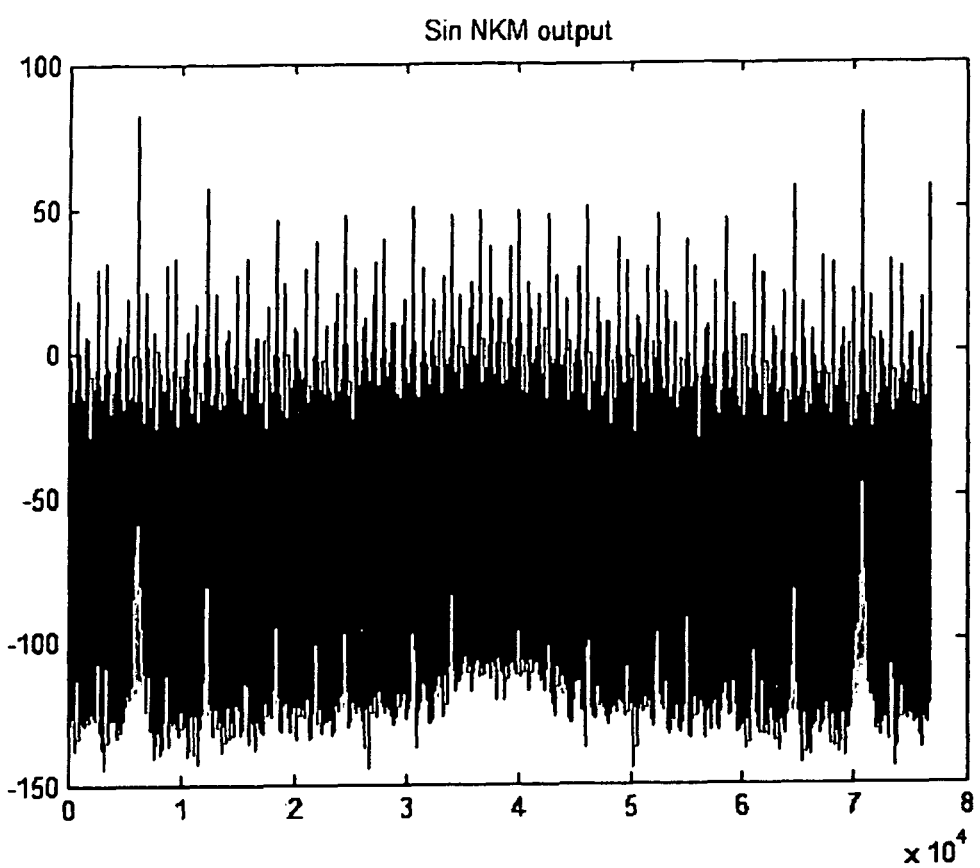
FIG. 8B is a plot illustrating the spectrum of the output of a nonlinear keying demodulator embodiment, given the input shown in FIG. 8A
Figure 8C:
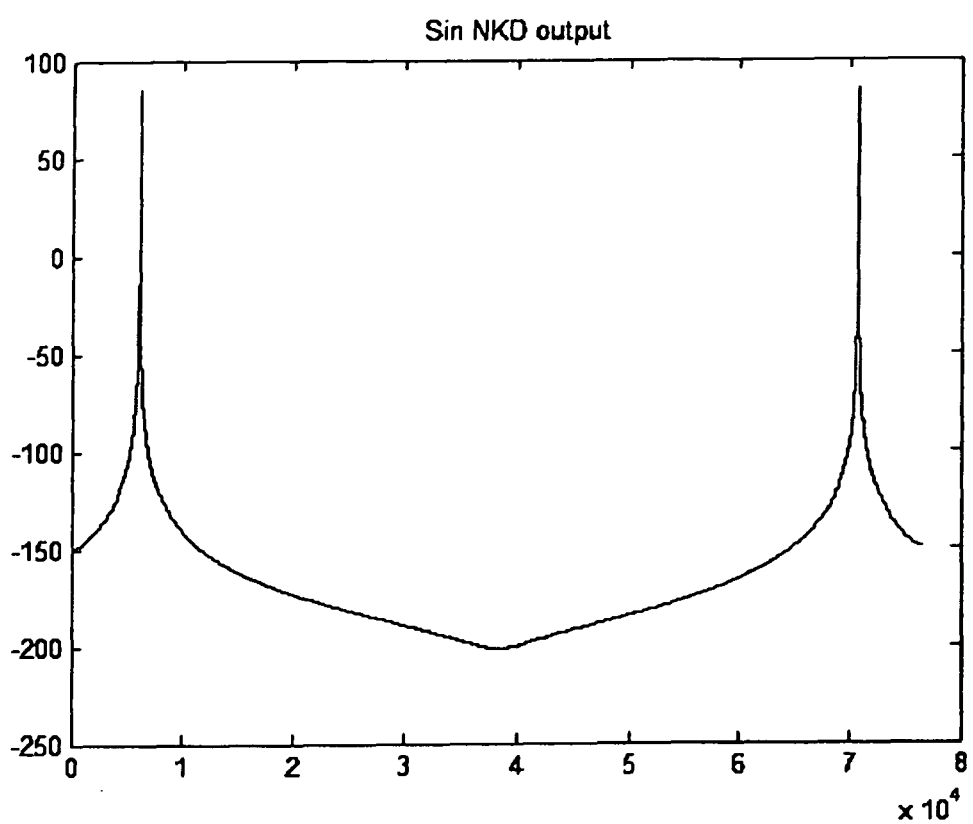
FIG. 8C is a plot illustrating the spectrum of a nonlinear keying demodulator output with the input shown in FIG. 8B.

FIG. 8A is a plot illustrating the spectrum of an input sinusoid. The signal is input into a nonlinear keying modulator embodiment. The sine wave input forms the peak at 800. FIG. 8B is a plot illustrating the spectrum of the output of a nonlinear keying demodulator embodiment, given the input shown in FIG. 8A. The input signal is spread by the NKD in a nonlinear fashion and has a wider bandwidth. FIG. 8C is a plot illustrating the spectrum of a nonlinear keying demodulator output with the input shown in FIG. 8B. The NKD in this embodiment is the inverse of the NKM embodiment used for FIG. 8A, and thus the original signal is recovered by the demodulation process.

Figure 8D:
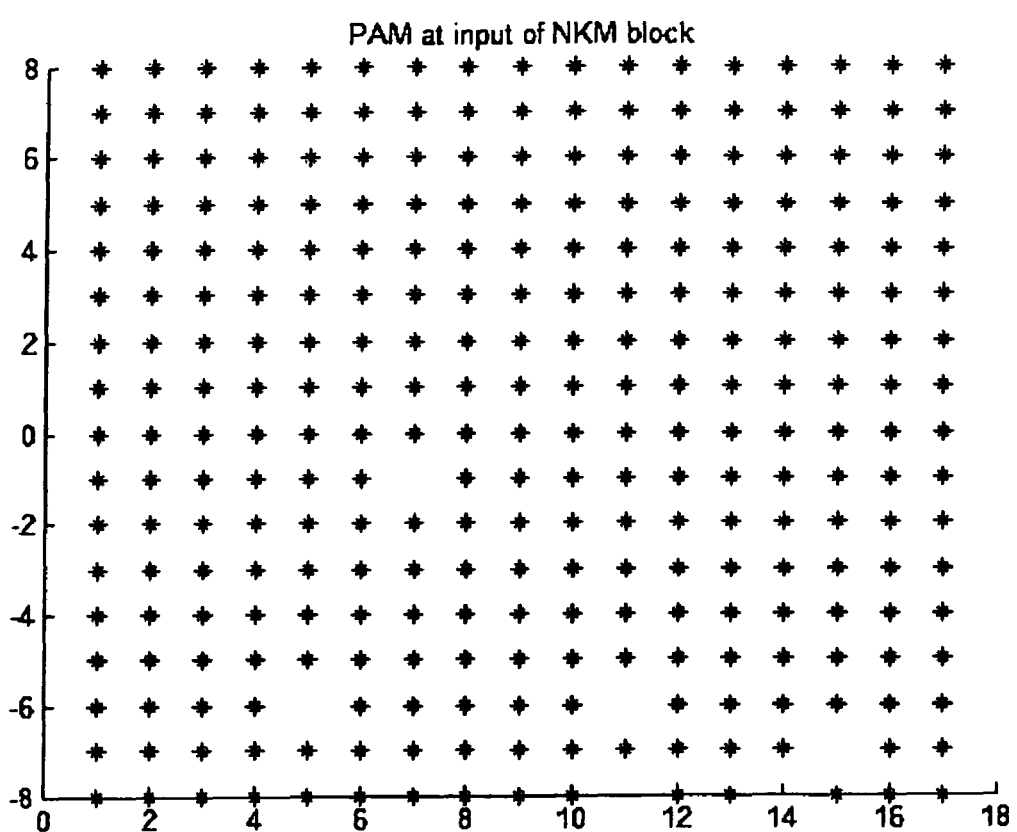
FIG. 8D is a plot illustrating the time domain pulse amplitude modulated (PAM) signal input into a nonlinear keying modulator embodiment.
Figure 8E:
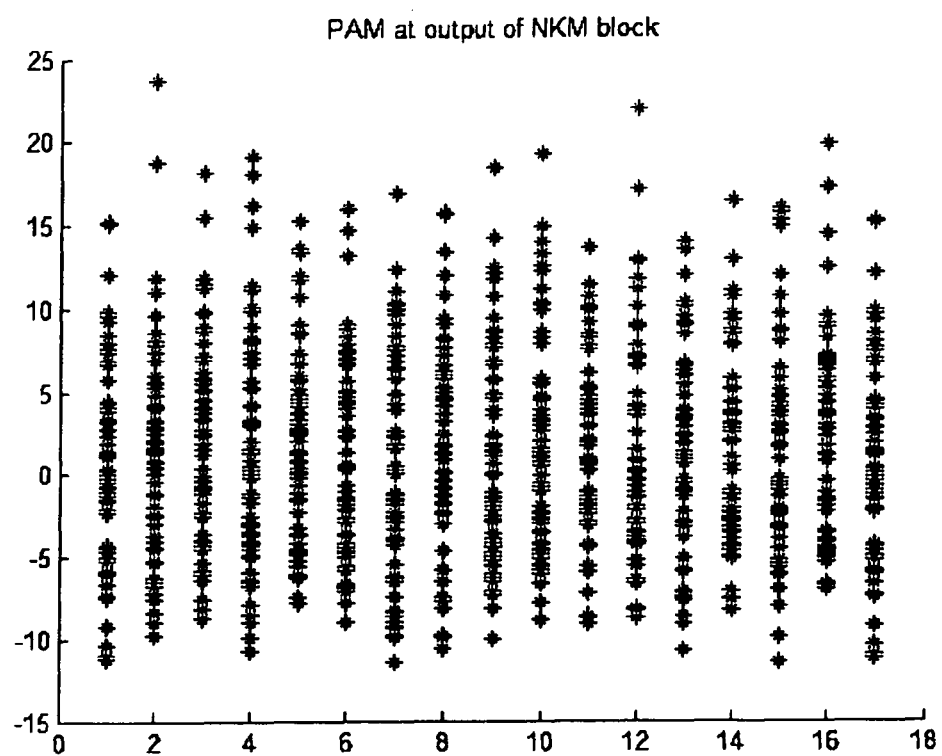
FIG. 8E is a plot illustrating the output of a nonlinear keying modulator embodiment, given the input shown in FIG. 8D.
Figure 8F:
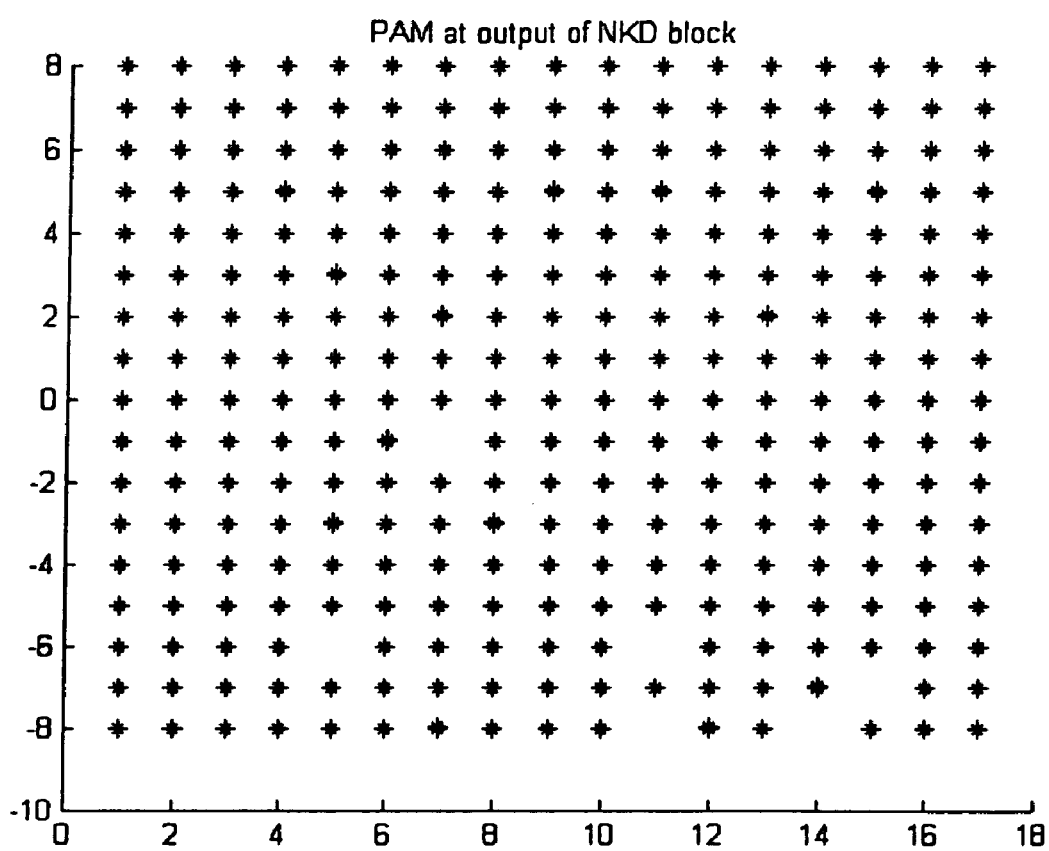
FIG. 8F is a plot illustrating the output of a nonlinear keying demodulator embodiment.

FIG. 8D is a plot illustrating the time domain pulse amplitude modulated (PAM) signal input into a nonlinear keying modulator embodiment. FIG. 8E is a plot illustrating the output of a nonlinear keying modulator embodiment, given the input shown in FIG. 8D. The PAM symbols are scrambled in a nonlinear fashion by the NKD, and cannot be descrambled using conventional linear equalization, de-convolution or de-correlation techniques. FIG. 8F is a plot illustrating the output of a nonlinear keying demodulator embodiment. The NKD is the inverse of the NKM used to produce FIG. 8E. The plot shows that the NKD fully recovers the original symbols.

A technique for secure communication is disclosed. The technique employs a nonlinear key modulator in the transmitter to nonlinearly encrypt the signal, and a corresponding nonlinear key demodulator in the receiver to decrypt the transmitted signal. The resulting system provides good security, is stable, flexible and easy to implement.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A transmitter for securely transmitting a signal, including:
   an input interface for receiving the signal; and
   a nonlinear keying modulator configured to encrypt the signal using a nonlinear keying modulation technique;
   wherein the nonlinear keying modulator encrypts the signal using a nonlinear filter that comprises a plurality of linear filters, the nonlinear filter having stability that is controllable by adjusting the plurality of linear filters.

2. A transmitter for securely transmitting a signal as recited in claim 1, wherein the nonlinear keying modulator is configured to encrypt the signal to be decrypted by a receiver.

3. A transmitter for securely transmitting a signal as recited in claim 1, wherein the nonlinear keying modulator is configured to encrypt the signal to be decrypted by a receiver by exchanging a key.

4. A transmitter for securely transmitting a signal as recited in claim 1, further including a linear modulator configured to linearly modulate the signal.

5. A transmitter for securely transmitting a signal as recited in claim 1, further including a linear modulator configured to linearly modulate the signal;

wherein the nonlinear keying modulator nonlinearly modulates the output of the linear modulator.

6. A transmitter for securely transmitting a signal as recited in claim 1, further including a linear modulator configured to linearly modulate the signal,
   wherein the linear modulator linearly modulates the output of the nonlinear keying modulator.

7. A transmitter for securely transmitting a signal as recited in claim 1, wherein the nonlinear keying modulator further includes a plurality of nonlinear elements and a combination network connecting the linear filters and nonlinear elements.

8. A transmitter for securely transmitting a signal as recited in claim 1, wherein the nonlinear keying modulator further includes a plurality of nonlinear elements and a combination network connecting the plurality of linear filters and the plurality of nonlinear elements; and the plurality of nonlinear elements include a minimum-maximum processor.

9. A transmitter for securely transmitting a signal as recited in claim 1, wherein the nonlinear keying modulator further includes a plurality of nonlinear elements and a combination network connecting the plurality of linear filters and the plurality of nonlinear elements; and the combination network is a minimum-maximum switching matrix.

10. A transmitter for securely transmitting a signal as recited in claim 1, wherein:
    the nonlinear keying modulator includes the plurality of linear filters having a number of filter coefficients, a plurality of nonlinear elements and a combination network connecting the linear filters and nonlinear elements; and
    the nonlinear keying modulator is adjustable by varying the number of filter coefficients.

11. A transmitter for securely transmitting a signal as recited in claim 1, wherein:
    the nonlinear modulator further includes a plurality of nonlinear elements and a combination network connecting the linear filters and nonlinear elements; wherein the plurality of linear filters include a plurality of feedforward filters; and
    the nonlinear keying modulator is adjustable by varying the plurality of feedforward filters.

12. A transmitter for securely transmitting a signal as recited in claim 1, wherein:
    the nonlinear modulator further includes a plurality of nonlinear elements and a combination network connecting the linear filters and nonlinear elements; wherein the plurality of linear filters include a plurality of feedback filters; and
    the nonlinear keying modulator is adjustable by varying the plurality of feedback filters.

13. A transmitter for securely transmitting a signal as recited in claim 1, wherein:
    the nonlinear keying modulator further includes a plurality of nonlinear elements and a combination network connecting the linear filters and nonlinear elements; and
    the nonlinear keying modulator is adjustable by varying a topology of the combination network.

14. A transmitter for securely transmitting a signal as recited in claim 1, wherein:
    the nonlinear keying modulator further includes a plurality of nonlinear elements and a combination network connecting the plurality of linear filters and the plurality of nonlinear elements; and
    poles of the plurality of linear filters are inside a unit circle.

15. A transmitter for securely transmitting a signal as recited in claim 1, wherein:

the nonlinear keying modulator further includes a plurality of nonlinear elements and a combination network connecting the plurality of linear filters and the plurality of nonlinear elements; and zeros of the plurality of linear filters are inside a unit circle.

16. A transmitter for securely transmitting a signal as recited in claim 1, wherein:
the nonlinear keying modulator further includes a plurality of nonlinear elements and a combination network connecting the plurality of linear filters and the plurality of nonlinear elements;
the nonlinear keying modulator is configured by receiving a key derived from the configurations of a receiver.

17. A transmitter for securely transmitting a signal as recited in claim 1, wherein:
the nonlinear keying modulator further includes a plurality of nonlinear elements and a combination network connecting the plurality of linear filters and the plurality of nonlinear elements;
the nonlinear keying modulator is configured by receiving a key derived from configurations of a receiver; and
each of the plurality of linear filters is configured to be the inverse of a corresponding linear filter in the receiver.

18. A transmitter for securely transmitting a signal as recited in claim 1, wherein:
the nonlinear keying modulator, further includes a plurality of nonlinear elements and a combination network connecting the plurality of linear filters and the plurality of nonlinear elements;
the plurality of nonlinear elements are a plurality of minimum-maximum processors;
the nonlinear keying modulator is configured by receiving a key derived from configurations of a receiver; and
the function of each of the plurality of minimum-maximum processors is configured to be the inverse of a corresponding minimum-maximum processor in the receiver.

19. A transmitter for securely transmitting a signal as recited in claim 1, wherein the nonlinear keying modulator is a first nonlinear keying modulator; and the transmitter further includes a second nonlinear keying modulator coupled to the first nonlinear keying modulator.

20. A transmitter for securely transmitting a signal as recited in claim 1, wherein the nonlinear keying modulator is a first nonlinear keying modulator; and the transmitter further includes a second nonlinear keying modulator coupled to the first nonlinear keying modulator in a cascaded configuration.

21. A receiver for decrypting a securely transmitted signal, including:
an input interface for receiving the signal; and
a nonlinear keying demodulator configured to decrypt the signal using a nonlinear keying demodulation technique;
wherein the nonlinear keying demodulator decrypts the signal using a nonlinear filter that comprises a plurality of linear filters, the nonlinear filter having stability that is controllable by adjusting the plurality of linear filters.

22. A receiver for decrypting a securely transmitted signal as recited in claim 21, further including a linear demodulator configured to linearly demodulate the signal.

23. A receiver for decrypting a securely transmitted signal as recited in claim 21, further including a linear demodulator configured to linearly demodulate the signal; wherein the nonlinear keying demodulator nonlinearly demodulates the output of the linear demodulator.

24. A receiver for decrypting a securely transmitted signal as recited in claim 21, further including a linear demodulator configured to linearly demodulate the signal, wherein the linear demodulator linearly demodulates the output of the nonlinear keying demodulator.

25. A receiver for decrypting a securely transmitted signal as recited in claim 21, wherein the nonlinear keying demodulator further includes a plurality of nonlinear elements and a combination network connecting the linear filters and nonlinear elements.

26. A receiver for decrypting a securely transmitted signal as recited in claim 21, wherein the nonlinear keying demodulator further includes a plurality of nonlinear elements and a combination network connecting the plurality of linear filters and the plurality of nonlinear elements; and the plurality of nonlinear elements include a minimum-maximum processor.

27. A receiver for decrypting a securely transmitted signal as recited in claim 21, wherein the nonlinear keying demodulator further includes a plurality of nonlinear elements and a combination network connecting the plurality of linear filters and the plurality of nonlinear elements; and the combination network is a minimum-maximum switching matrix.

28. A receiver for decrypting a securely transmitted signal as recited in claim 21, wherein:
the nonlinear keying demodulator includes the plurality of linear filters having a number of filter coefficients, a plurality of nonlinear elements and a combination network connecting the linear filters and nonlinear elements; and
the nonlinear keying demodulator is adjustable by varying the number of filter coefficients.

29. A receiver for decrypting a securely transmitted signal as recited in claim 21, wherein:
the nonlinear demodulator further includes a plurality of nonlinear elements and a combination network connecting the linear filters and nonlinear elements; wherein the plurality of linear filters include a plurality of feedforward filters; and
the nonlinear keying demodulator is adjustable by varying the plurality of feedforward filters.

30. A receiver for decrypting a securely transmitted signal as recited in claim 21, wherein:
the nonlinear demodulator further includes a plurality of nonlinear elements and a combination network connecting the linear filters and nonlinear elements; wherein the plurality of linear filters include a plurality of feedback filters; and
the nonlinear keying demodulator is adjustable by varying the plurality of feedback filters.

31. A receiver for decrypting a securely transmitted signal as recited in claim 21, wherein:
the nonlinear demodulator further includes a plurality of nonlinear elements and a combination network connecting the linear filters and nonlinear elements; and
the nonlinear keying demodulator is adjustable by varying a topology of the combination network.

32. A receiver for decrypting a securely transmitted signal as recited in claim 21, wherein:
the nonlinear keying demodulator further includes a plurality of nonlinear elements and a combination network connecting the plurality of linear filters and the plurality of nonlinear elements; and
poles of the plurality of linear filters are inside a unit circle.

33. A receiver for decrypting a securely transmitted signal as recited in claim 21, wherein:
the nonlinear keying demodulator further includes a plurality of nonlinear elements and a combination network connecting the plurality of linear filters and the plurality of nonlinear elements; and
zeros of the plurality of linear filters are inside a unit circle.

34. A receiver for decrypting a securely transmitted signal as recited in claim 22, wherein:
   the nonlinear keying demodulator further includes a plurality of nonlinear elements and a combination network connecting the plurality of linear filters and the plurality of nonlinear elements;
   the nonlinear keying demodulator is configured by receiving a key derived from configurations of a transmitter.

35. A receiver for decrypting a securely transmitted signal as recited in claim 21, wherein:
   the nonlinear keying demodulator further includes a plurality of nonlinear elements and a combination network connecting the plurality of linear filters and the plurality of nonlinear elements;
   the nonlinear keying demodulator is configured by receiving a key derived from configurations of a transmitter; and
   each of the plurality of linear filters is configured to be the inverse of a corresponding linear filter in the transmitter.

36. A receiver for decrypting a securely transmitted signal as recited in claim 21, wherein:
   the nonlinear keying demodulator further includes a plurality of nonlinear elements and a combination network connecting the plurality of linear filters and the plurality of nonlinear elements;
   the plurality of nonlinear elements are a plurality of minimum-maximum processors;
   the nonlinear keying demodulator is configured by receiving a key derived from configurations of a transmitter; and
   the function of each of the plurality of minimum-maximum processors is configured to be the inverse of a corresponding minimum-maximum processor in the transmitter.

37. A receiver for decrypting a securely transmitted signal as recited claim 21, wherein the nonlinear keying demodulator is a first nonlinear keying demodulator; and the receiver further includes a second nonlinear keying demodulator coupled to the first nonlinear keying demodulator.

38. A receiver for decrypting a securely transmitted signal as recited claim 21, wherein the nonlinear keying demodulator is a first nonlinear keying demodulator; and the receiver further includes a second nonlinear keying demodulator coupled to the first nonlinear keying demodulator in a cascaded configuration.

\* \* \* \* \*

UNITED STATES PATENT AND TRADEMARK OFFICE
CERTIFICATE OF CORRECTION

PATENT NO.       : 8,340,294 B2  
APPLICATION NO.  : 12/008709  
DATED            : December 25, 2012  
INVENTOR(S)      : Roy G. Batruni Page 1 of 1

It is certified that error appears in the above-identified patent and that said Letters Patent is hereby corrected as shown below:

Title Page, Item (75), please replace "Fremont" with --Danville--;

In the Claims

Column 9, Line 13, Claim 16, please replace "the configurations" with --configurations--;

Column 9, Line 26, Claim 18, please replace "modulator," with --modulator--;

Column 12, Line 12, Claim 37, please replace "claim" with --in claim--; and

Column 12, Line 17, Claim 38, please replace "claim" with --in claim--.

Signed and Sealed this  
First Day of April, 2014

Michelle K. Lee  
*Deputy Director of the United States Patent and Trademark Office*